(12) United States Patent
Sanada et al.

(10) Patent No.: US 10,776,648 B2
(45) Date of Patent: Sep. 15, 2020

(54) MAGNETIC INK READER AND PRINTER HAVING THE SAME

(71) Applicant: TOSHIBA TEC KABUSHIKI KAISHA, Tokyo (JP)

(72) Inventors: Tsuyoshi Sanada, Susono Shizuoka (JP); Yuji Kawamorita, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 198 days.

(21) Appl. No.: 16/122,774

(22) Filed: Sep. 5, 2018

(65) Prior Publication Data

US 2019/0073549 A1 Mar. 7, 2019

(30) Foreign Application Priority Data

Sep. 7, 2017 (JP) .................................. 2017-172312

(51) Int. Cl.
*G06K 9/18* (2006.01)
*G06K 7/08* (2006.01)
*G06K 19/06* (2006.01)

(52) U.S. Cl.
CPC ............. *G06K 9/186* (2013.01); *G06K 7/084* (2013.01); *G06K 7/087* (2013.01); *G06K 19/06187* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,399,553 A * | 8/1983 | Toyama | ................. | G06K 9/186 382/139 |
| 5,418,458 A * | 5/1995 | Jeffers | .................... | G01R 33/09 194/213 |
| 5,512,822 A * | 4/1996 | Masuda | ................. | G06K 7/087 209/569 |
| 5,532,584 A * | 7/1996 | Jeffers | .................... | G01R 33/09 324/202 |
| 5,552,589 A * | 9/1996 | Smith | .................... | G01R 33/09 235/449 |

(Continued)

FOREIGN PATENT DOCUMENTS

| | | |
|---|---|---|
| JP | 2001-283401 A | 10/2001 |
| JP | 2004-206316 A | 7/2004 |

*Primary Examiner* — Mazda Sabouri
(74) *Attorney, Agent, or Firm* — Kim & Stewart LLP

(57) ABSTRACT

A magnetic ink reader includes a conveyance mechanism for a sheet, a magnetizing mechanism configured to magnetize magnetic ink on the sheet and including a magnet having a first side of a first polarity, that is arranged to face the sheet, and a yoke that is formed of a soft magnetic material and includes a base portion attached directly to a second side of the magnet, and a partition wall of a second polarity extending towards the conveyance path, such that a side surface of the partition wall faces a third side of the magnet and an end surface of the partition wall faces the sheet, and a magnetic detection head for detecting magnetism of magnetized magnetic ink. A first distance between the conveyance path and the first side of the magnet and a second distance between the conveyance path and the end surface of the partition wall are different.

15 Claims, 8 Drawing Sheets

(56) References Cited

U.S. PATENT DOCUMENTS

| | | | |
|---|---|---|---|
| 5,616,911 A * | 4/1997 | Jagielinski | G06K 7/084 235/449 |
| 5,644,228 A * | 7/1997 | Jeffers | G01R 33/09 235/449 |
| 5,667,924 A * | 9/1997 | Ziolo | G03G 9/083 427/467 |
| 2015/0102808 A1 * | 4/2015 | Ogomi | G01R 33/096 324/252 |
| 2017/0200055 A1 * | 7/2017 | Saga | G06Q 20/042 |
| 2018/0264801 A1 * | 9/2018 | Fukumoto | B41F 19/007 |

* cited by examiner

MAGNETIC INK READER AND PRINTER HAVING THE SAME

CROSS-REFERENCE TO RELATED APPLICATION

This application is based upon and claims the benefit of priority from Japanese Patent Application No. 2017-172312, filed in Sep. 7, 2017, the entire contents of which are incorporated herein by reference.

FIELD

Embodiments described herein relate to a magnetic ink reader that reads magnetic ink characters and a printer having the same.

BACKGROUND

Magnetic ink character recognition (MICR) characters may be printed on a front surface of a medium such as a bill or a check. Such MICR characters are read by a magnetic ink reader as follows. When the medium is inserted into the reader, a magnet magnetizes the MICR characters. Then, an MICR head, which is a magnetic detection head, detects a residual magnetic field generated by residual magnetism of the MICR characters, and identifies the MICR characters from a magnetic property or a magnetic pattern of the detected magnetic field. From the MICR characters, bills and checks can be distinguished.

Such a magnetic ink reader is incorporated in an ATM or a POS printer 100 as illustrated in FIG. 1, for example. In FIG. 1, P represents a sheet-like medium such as a bill or a check, and K represents a conveyance path of the medium P. FIG. 2 illustrates an example of the medium P. The medium P includes a sheet-like medium body Pa. Characters Pb and MICR characters Pc are printed on the medium body Pa by normal ink and magnetic ink, respectively.

In the printer 100, a magnet 101, an MICR head 102, a feed roller 103 and a pinch roller 104, and an inkjet head 105 and a platen 106 are arranged along the conveyance path K from the left side in FIG. 1. In addition, the printer 100 is provided with a motor 110 configured to drive the feed roller 103 and a gear mechanism 111 configured to transmit torque of the motor 110.

As the magnet 101, a powerful permanent magnet is used to stably magnetize the MICR character Pc. The magnetic field of the magnet 101 has such a property that lines of magnetic force generated from an N pole cause the side surface of the magnet to turn around and become an S pole. Therefore, the magnetic force is the strongest near the magnet 101. Further, the magnet 101 and the MICR head 102 are provided corresponding to the position of the MICR character Pc of the medium P to be conveyed on the conveyance path K.

The printer 100 performs reading by magnetizing the MICR character Pc and detecting the residual magnetic field. In such a printer 100, since reading the MICR character Pc is required to be accurate, magnetization is also required to be performed accurately.

In order to stably magnetize the MICR character Pc, the MICR character Pc is passed in the vicinity of the magnet 101 to magnetize the MICR character with a powerful magnetic force. Since the magnet force in the magnetic field varies greatly depending on position, the relative position between the MICR character Pc and the magnet 101 needs to be adjusted with high accuracy.

However, since the motor 110 configured to convey the medium P is in the vicinity of the magnet 101, vibration of the motor 110 may be transmitted to the magnet 101 or the MICR head 102. When the vibration is transmitted to the magnet 101, the relative position between the magnet 101 and the MICR character Pc fluctuates, and a magnetizing force with respect to the MICR character Pc also sometimes fluctuates. Since the fluctuation of the magnetizing force appears as fluctuation in the magnetic property or the magnetic pattern to be detected by the MICR head 102, the fluctuation has an impact on reading accuracy.

The magnet 101 with a powerful magnetic force may be used to offset the fluctuation. However, since the distance between the magnet 101 and the MICR head 102 is about 4 to 5 cm, the magnetic force of the magnet 101 may affect the reading accuracy of the MICR head 102.

Therefore, there is a need for an apparatus which is capable of reading magnetic ink to be printed on a medium with high accuracy.

DETAILED DESCRIPTION

Embodiments provide a magnetic ink reader capable of performing stable magnetization of magnetic ink characters to be read, even in the presence of external disturbance such as vibration of a motor within a printer that employs such a magnetic ink reader.

In general, according to one embodiment, a magnetic ink reader includes a conveyance mechanism configured to convey a sheet-like medium along a conveyance path, a magnetizing mechanism configured to magnetize magnetic ink formed on the sheet-like medium conveyed thereto along the conveyance path and including a magnet having a first side of a first magnetic polarity, that is arranged to face the sheet-like medium that is conveyed along the conveyance mechanism to the magnetizing mechanism, and a yoke that is formed of a soft magnetic material and includes a base portion attached directly to a second side of the magnet, which is opposite to the first side, and a partition wall of a second magnetic polarity extending towards the conveyance path, such that a side surface of the partition wall faces a third side of the magnet and an end surface of the partition wall faces the sheet-like medium that is conveyed along the conveyance mechanism to the magnetizing mechanism, and a magnetic detection head disposed along the conveyance path and configured to detect magnetism of magnetized magnetic ink formed on the sheet-like medium. A first distance between the conveyance path and the first side of the magnet and a second distance between the conveyance path and the end surface of the partition wall are different.

An embodiment will be described below with reference to the drawings.

Figure 1:
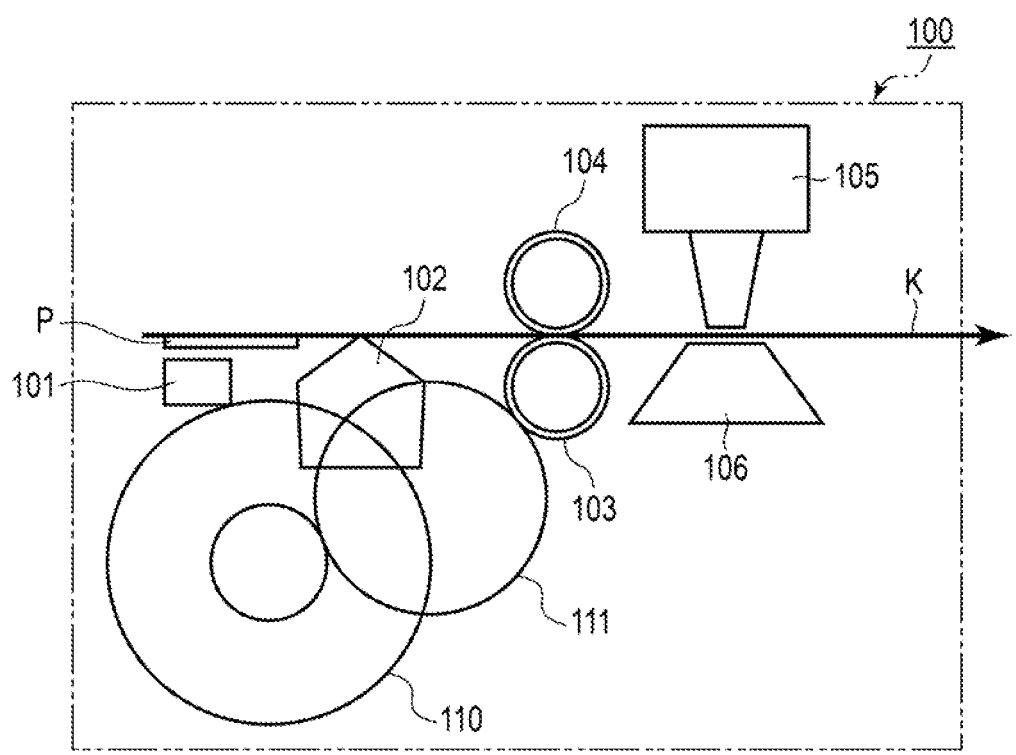
FIG. 1 is a diagram of a printer incorporating a conventional magnetic ink reader.
Figure 2:
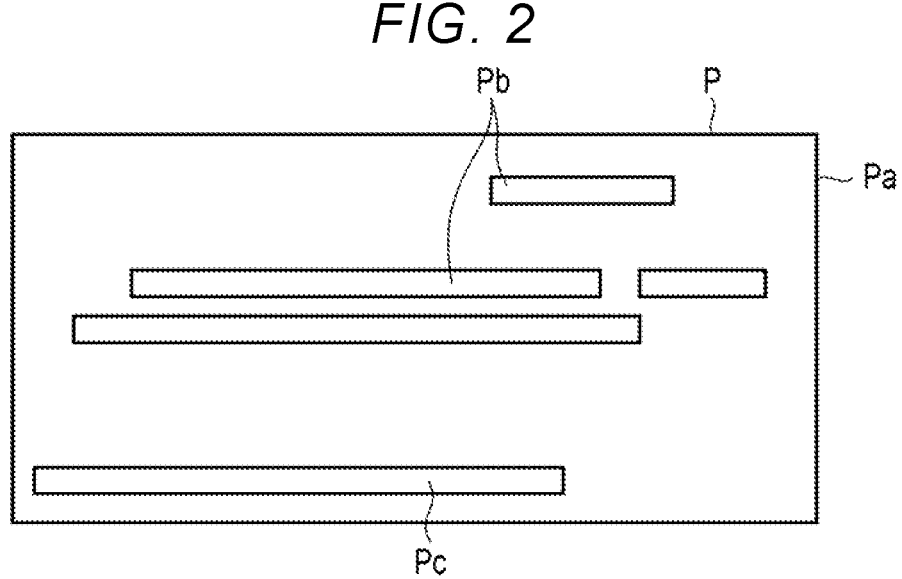
FIG. 2 is a plan view of a medium on which magnetic ink is printed.
Figure 3:
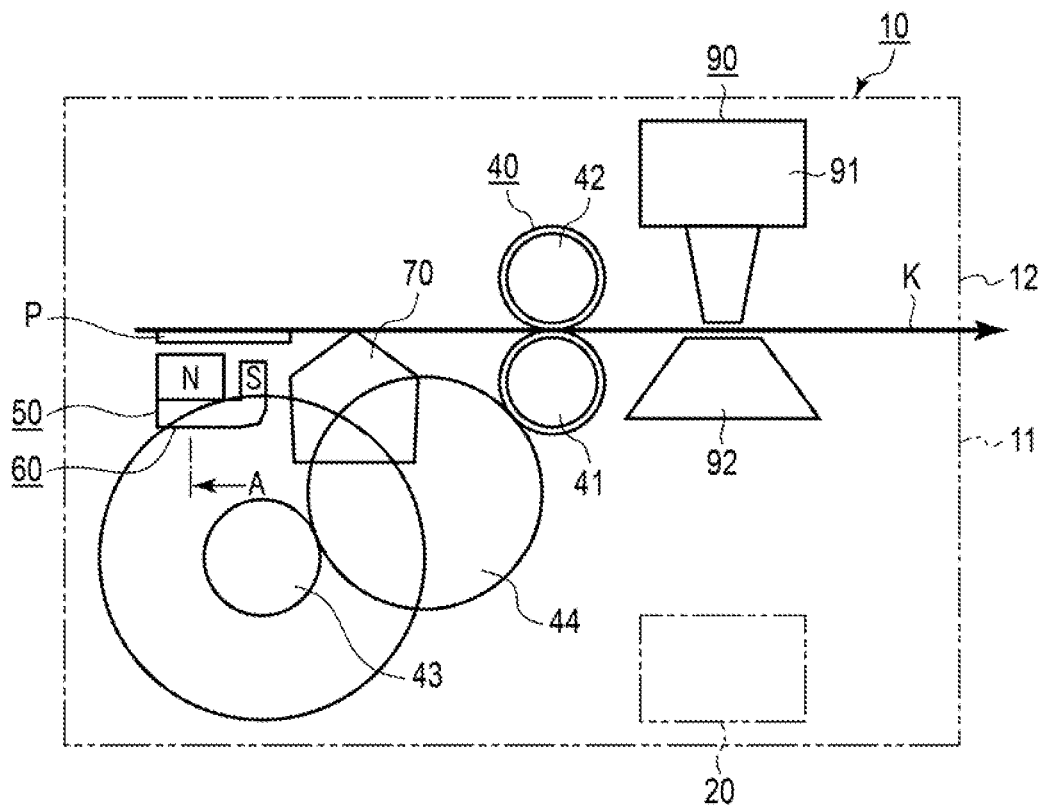
FIG. 3 is a diagram of a printer incorporating a magnetic ink reader according to an embodiment.

FIG. 3 is a diagram of a printer 10 incorporating a magnetic ink reader 50 according to the embodiment. The printer 10 is installed in an ATM of a bank or a POS (Point Of Sales) terminal of a store or a warehouse. In the drawings, P represents a sheet-like medium such as a bill, a check, or a gift certificate, and K represents a conveyance path of the medium P. As shown in FIG. 2, the medium P includes a sheet-like medium body Pa. Characters Pb and MICR characters Pc are printed on the medium body Pa by normal ink and magnetic ink, respectively.

The printer 10 includes a housing 11. The conveyance path K is formed inside the housing 11. At a right end of the conveyance path K in FIG. 3, a slot 12 is provided through which the medium P is inserted from and ejected to the outside. When the printer 10 is used, a front surface of a medium on which magnetic ink is previously printed is inserted face down in FIG. 3.

The housing 11 accommodates a control unit 20 (e.g., a control circuit), a conveyance mechanism 40, a magnetic ink reader 50, and a printing mechanism 90 therein, and the printing mechanism 90 is provided closer to the slot 12 compared with the magnetic ink reader 50. The control unit 20 controls the conveyance mechanism 40, the magnetic ink reader 50, and the printing mechanism 90.

The conveyance mechanism 40 forms the conveyance path K, through which the sheet-like medium P printed with magnetic ink is conveyed, with a plurality of rollers including a feed roller 41 and a pinch roller 42. The conveyance mechanism 40 includes a motor 43 and a gear mechanism 44 configured to transmit torque of the motor 43 to each of the roller.

The magnetic ink reader 50 includes a magnetizing mechanism 60 to magnetize the magnetic ink of the medium P on the conveyance path K and an MICR head 70. The MICR head 70 is disposed at a downstream side of the conveyance path K of the magnetizing mechanism 60, about 4 to 5 cm away from the magnetizing mechanism 60. The MICR head 70 reads magnetism of the magnetized magnetic ink.

Figure 4:
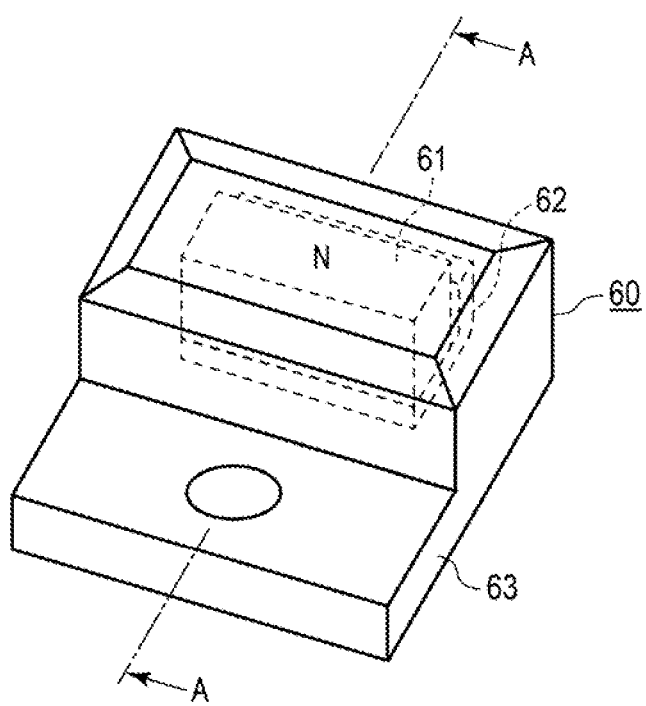
FIG. 4 is a perspective view illustrating a magnetizing mechanism incorporated in the magnetic ink reader according to the embodiment.
Figure 5:
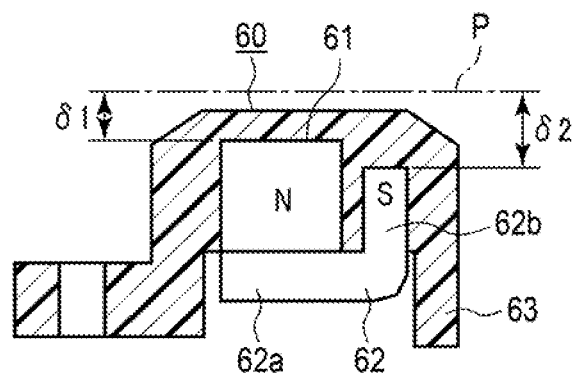
FIG. 5 is a cross-sectional view of the magnetizing mechanism of the embodiment taken along line A-A in FIG. 4.
Figure 6:
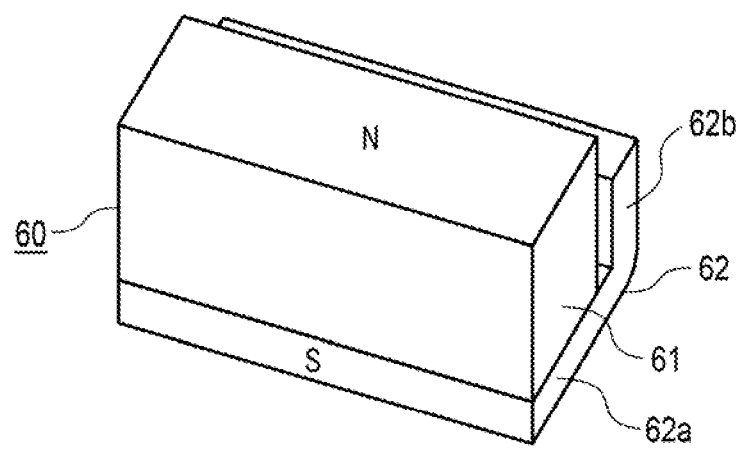
FIG. 6 is a perspective view illustrating the magnetizing mechanism without a resin portion.

FIG. 4 is a perspective view illustrating the magnetizing mechanism incorporated in the magnetic ink reader according to the embodiment, FIG. 5 is a cross-sectional view of the magnetizing mechanism of the embodiment taken along line A-A in FIG. 4, and FIG. 6 is a perspective view illustrating the magnetizing mechanism of the embodiment without a resin portion.

As illustrated in FIGS. 4 to 6, the magnetizing mechanism 60 includes a magnet 61 in which one polar surface (e.g., an N pole surface) faces the front surface of the medium P conveyed along the conveyance path K. A yoke member 62 is L-shaped and is directly attached to the other polar surface (e.g., an S pole surface) of the magnet 61. The yoke member 62 is formed of a soft magnetic material, for example, electrogalvanized steel or permalloy which is inexpensive and suitable.

The yoke member 62 includes a base portion 62a attached to the S pole surface of the magnet 61, and a partition wall 62b that extends toward the conveyance path K on the side of the MICR head 70 at a side surface of the magnet 61 from the base portion 62a and includes a front end facing the conveyance path K. By the yoke member 62, an S pole is generated in the partition wall 62b.

As illustrated in FIG. 5, a distance δ2 between the front surface of the medium P and the partition wall 62b is larger than a distance δ1 between the front surface of the medium P and the N pole of the magnet 61.

As illustrated in FIGS. 4 and 5, the magnet 61 and the yoke member 62 are covered with a resin material 63. The resin material 63 prevents the magnet 61 and the yoke member 62 from coming into contact with or closely contacting another metal member, and prevents another metal member from being magnetized. In addition, the resin material 63 prevents the medium P from contacting the magnet 61, thereby preventing damage to the medium P, and also keeps the distance between the medium P and the N pole of the magnet 61 constant.

The MICR head 70 detects a residual magnetic force of the MICR character Pc. The detected residual magnetic force is read as a magnetic property or a magnetic pattern and is output as an electric signal to the control unit 20. By comparing the detected residual magnetic force with a magnetic property or a magnetic pattern of the MICR character Pc preset in the control unit 20, the MICR character Pc is identified.

The printing mechanism 90 includes an inkjet head 91 and a platen 92. The platen 92 is disposed so as to sandwich the conveyance path K with the inkjet head 91.

In the printer 10 described above, magnetic ink reading and printing are performed in the following manner. That is, the medium P is inserted through the slot 12 of the housing 11 such that the front surface printed with the MICR character Pc faces downward. The inserted medium P is conveyed toward a left side in FIG. 3 along the conveyance path K by the conveyance mechanism 40.

Figure 7:
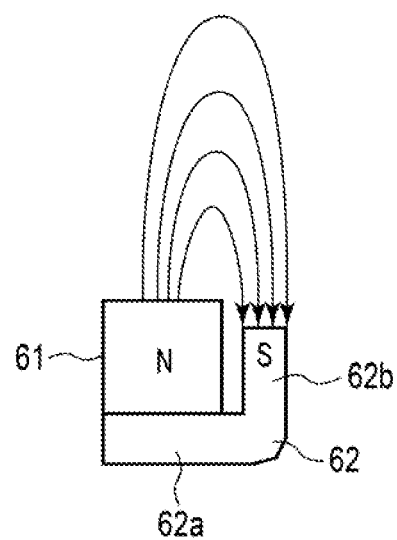
FIG. 7 is a diagram illustrating a magnetic field of the magnetizing mechanism.

When the medium P reaches the magnetizing mechanism 60, the MICR character Pc passes through the magnetizing mechanism 60. At this time, the MICR character Pc is magnetized by the magnetic force of the magnet 61. Here, as illustrated in FIG. 7, the magnetic field generated by the magnet 61 is directed from the N pole of the magnet 61 to the S pole of the partition wall 62b, and a very small magnetic field leaks to the outside of the magnetizing mechanism 60. Further, since the magnetic force in the vicinity of the N pole of the magnet 61 is substantially constant, even if the distance between the N pole of the magnet 61 and the MICR character Pc varies due to vibration caused by the motor 43, the residual magnetism of the MICR character Pc is substantially constant. In addition, since the distance δ2 between the front surface of the medium P and the partition wall 62b is larger than the distance δ1 between the front surface of the medium P and the N pole of the magnet 61, the MICR character Pc on the medium P is reliably magnetized by the N pole.

When the medium P is conveyed to a right side in FIG. 3 by the conveyance mechanism 40 and thus the MICR character Pc reaches the MICR head 70, the MICR head 70 detects the residual magnetic field generated by the residual magnetism of the MICR character Pc. From the magnetic property or the magnetic pattern of the residual magnetism, the MICR character Pc is identified.

Next, when the medium P is conveyed to the right side in FIG. 3 by the conveyance mechanism 40 and thus the medium P reaches the printing mechanism 90, the inkjet head 91 performs printing such as "used" or "invalid" according to the determination result of the medium P described above.

The medium P, on which the printing is completed, is ejected from the slot 12 of the housing 11 by the conveyance mechanism 40.

According to the printer 10 described above, even if the vibration occurs due to the external disturbance of the motor 43, the residual magnetism applied to the MICR character Pc does not fluctuate largely. That is, the magnetizing mechanism 60 can reliably apply the residual magnetism to the MICR character under the stable magnetic field. Therefore, the MICR head 70 can read the residual magnetism with high accuracy, and can minimize erroneous recognition or erroneous occurrence. In addition, since the yoke member 62 is directly attached to the magnet 61, the yoke member 62 can be formed of an inexpensive soft magnetic material. Further, the yoke member 62 is provided on the side of the MICR head 70, and thus it is possible to prevent the influence of the magnetic field on the MICR head 70 due to the magnet 71.

Figure 8:
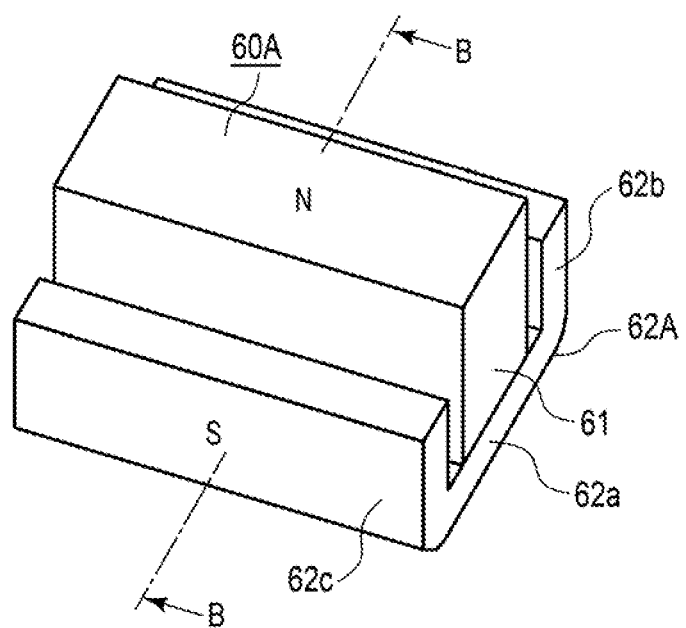
FIG. 8 is a perspective view illustrating a magnetizing mechanism according to a modified example.
Figure 9:
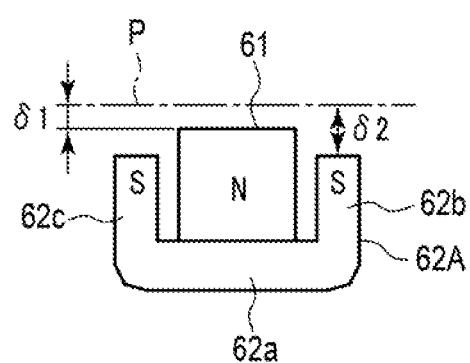
FIG. 9 is a cross-sectional view of the magnetizing mechanism according to the modified example taken along line B-B in FIG. 8.

FIGS. 8 and 9 illustrate a modified magnetizing mechanism 60A. In these drawings, the same functional parts as those in FIGS. 3 to 6 are denoted by the same reference numerals, and a detailed description thereof will not be presented. As illustrated in FIGS. 8 and 9, the magnetizing mechanism 60A includes a magnet 61 in which one polar surface (e.g., an N polar surface) faces the front surface of the medium P conveyed along the conveyance path K. A yoke member 62 is U-shaped and is directly attached to the other polar surface (e.g., an S pole surface) of the magnet 61.

The yoke member 62 includes a base portion 62a attached to the S pole surface of the magnet 61, a partition wall 62b that extends toward the conveyance path K on the side of the MICR head 70 at a side surface of the magnet 61 from the base portion 62a and includes a front end facing the conveyance path K, and a partition wall 62c that is provided on a side opposite to the partition wall 62b so as to sandwich the base portion 62a with the partition wall 62b. By the yoke member 62, an S pole is generated in the partition walls 62b and 62c.

As illustrated in FIG. 9, a distance δ2 between the front surface of the medium P and the partition wall 62b is larger than a distance δ1 between the front surface of the medium P and the N pole of the magnet 61. Although not illustrated, the magnetizing mechanism 60A is also covered with the resin material 63.

Even if the printer uses the magnetizing mechanism 60A described above, the same effect can be obtained as the printer 10 using the magnetizing mechanism 60. Since the yoke member 62 is provided with the partition wall 62c, a uniform magnetic field is generated around the magnet 61 and the MICR character Pc can be stably magnetized. In addition, since the yoke member 62 is directly attached to the magnet 61, the yoke member 62 can be formed of an inexpensive soft magnetic material.

Figure 10:
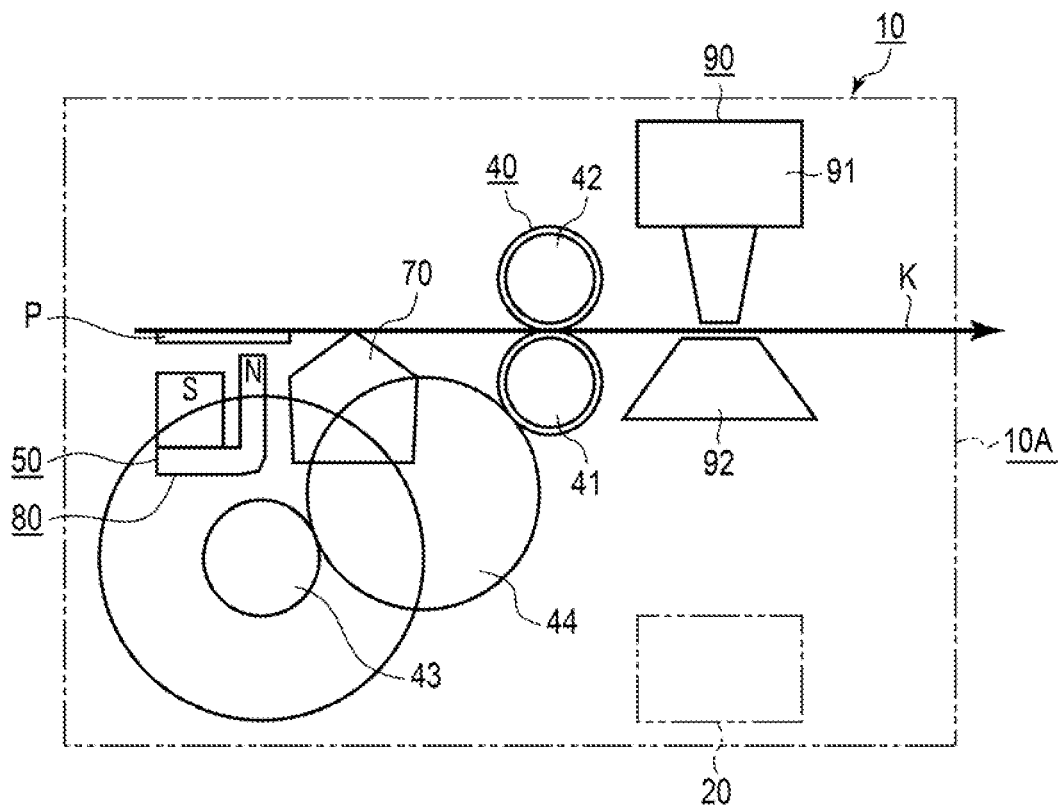
FIG. 10 is a diagram of a printer incorporating a magnetic ink reader according to the embodiment.
Figure 11:
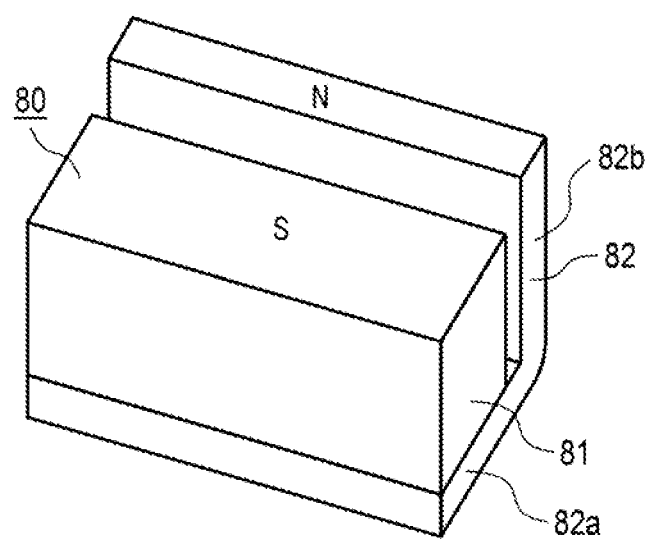
FIG. 11 is a perspective view illustrating a magnetizing mechanism incorporated in the magnetic ink reader according to the embodiment without a resin portion.
Figure 12:
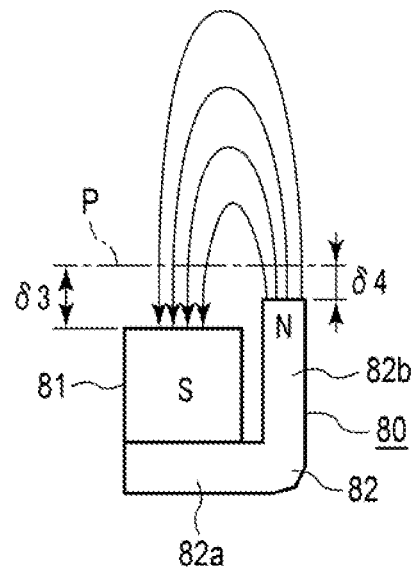
FIG. 12 is a diagram illustrating a magnetic field of the magnetizing mechanism according to the embodiment.

FIG. 10 is a diagram of a printer 10A incorporating a magnetic ink reader 50A according to the embodiment, FIG. 11 is a perspective view illustrating a magnetizing mechanism 80 without a resin portion, and FIG. 12 is a diagram illustrating a magnetic field of the magnetizing mechanism 80 according to the embodiment. In these drawings, the same functional parts as those in FIGS. 3 to 6 are denoted by the same reference numerals, and a detailed description thereof will not be presented.

The magnetizing mechanism 80 is provided instead of the magnetizing mechanism 60 described above. As illustrated in FIG. 11, the magnetizing mechanism 80 includes a magnet 81 in which one polar surface (e.g., an S pole surface) faces the front surface of the medium P conveyed along the conveyance path K. A yoke member 82 is L-shaped and is directly attached to the other polar surface (e.g., an N pole surface) of the magnet 81. The yoke member 82 is formed of a soft magnetic material, for example, electrogalvanized steel or permalloy which is inexpensive and suitable.

The yoke member 82 includes a base portion 82a attached to the N pole surface of the magnet 81, and a partition wall 82b that extends toward the conveyance path K on the side of the MICR head 70 at a side surface of the magnet 81 from the base portion 82a and includes a front end facing the conveyance path K. By the yoke member 82, an N pole is generated in the partition wall 82b.

As illustrated in FIG. 12, a distance δ3 between the front surface of the medium P and the S pole of the magnet 81 is larger than a distance δ4 between the front surface of the medium P and the partition wall 82b.

In the magnetizing mechanism 80, the magnet 81 and the yoke member 82 are also formed with a resin material (not illustrated). The resin material prevents the magnet 81 and the yoke member 82 from coming into contact with or closely contacting with another metal member, and prevents another metal member from being magnetized. In addition, the resin material prevents the medium P from contacting with the yoke member 82, thereby preventing damage to the medium P, and also keeps the distance between the medium P and the N pole of the yoke member 82 constant. Further, since the yoke member 82 is directly attached to the magnet 81, the yoke member 82 can be formed of an inexpensive soft magnetic material.

Figure 13:
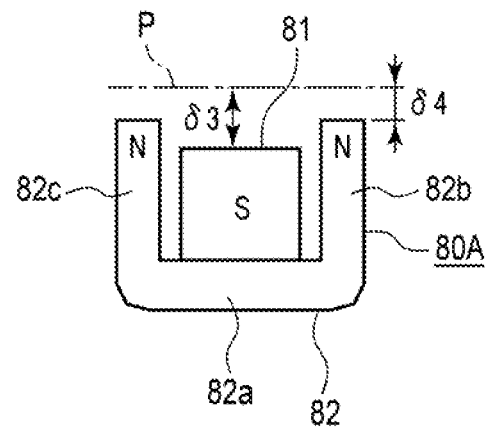
FIGS. 13-14 are each a cross-sectional view illustrating a magnetizing mechanism according to a modified example of the embodiment.

FIG. 13 illustrates a modified magnetizing mechanism 80A. In these drawings, the same functional parts as those in FIGS. 10 to 12 are denoted by the same reference numerals, and a detailed description thereof will not be presented. As illustrated in FIG. 13, the magnetizing mechanism 80A includes a magnet 81 in which one polar surface (e.g., an S pole surface) faces the front surface of the medium P. A yoke member 82 is L-shaped and is directly attached to the other polar surface (e.g., an N pole surface) of the magnet 81.

The yoke member 82 includes a base portion 82a attached to the N pole surface of the magnet 81, a partition wall 82b that extends toward the conveyance path K on the side of the MICR head 70 at a side surface of the magnet 81 from the base portion 82a and includes a front end facing the conveyance path K, and a partition wall 82c that is provided on a side opposite to the partition wall 82b so as to sandwich the base portion 82a with the partition wall 82b. By the yoke member 82, an N pole is generated in the partition walls 82b and 82c.

As illustrated in FIG. 13, a distance δ3 between the front surface of the medium P and the S pole of the magnet 81 is larger than a distance δ4 between the front surface of the medium P and the partition walls 82b and 82c. Although not illustrated, the magnetizing mechanism 80A is also covered with a resin material.

Even if the printer uses the magnetizing mechanism 80A described above, the same effect can be obtained as the printer 10A using the magnetizing mechanism 80. In addition, since the yoke member 82 is directly attached to the magnet 81, the yoke member 82 can be formed of an inexpensive soft magnetic material.

Figure 14:
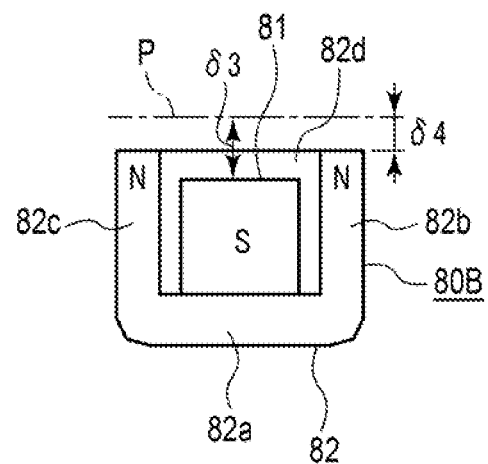

FIG. 14 illustrates a modified magnetizing mechanism 80B. In these drawings, the same functional parts as those in FIG. 13 are denoted by the same reference numerals, and a detailed description thereof will not be presented. As illustrated in FIG. 14, the magnetizing mechanism 80B includes a magnet 81 in which one polar surface (e.g., an S pole surface) of the magnet 81 faces the front surface of the medium P. A yoke member 82 is U-shaped and is directly attached to the other polar surface (e.g., an N pole surface) of the magnet 81.

The yoke member 82 includes a base portion 82a attached to the N pole surface of the magnet 81, a partition wall 82b that extends toward the conveyance path K on the side of the MICR head 70 at a side surface of the magnet 81 from the base portion 82a and includes a front end facing the conveyance path K, a partition wall 82c that is provided on a side opposite to the partition wall 82b so as to sandwich the base portion 82a with the partition wall 82b, and a partition wall 82d that is provided at a position orthogonal to the conveying direction in the conveyance path K. By the yoke member 82, an N pole is generated in the partition walls 82b, 82c, and 82d.

As illustrated in FIG. 14, a distance δ3 between the front surface of the medium P and the S pole of the magnet 81 is larger than a distance δ4 between the front surface of the medium P and the partition walls 82b and 82c. Although not illustrated, the magnetizing mechanism 80B is also covered with a resin material.

Even if the printer uses the magnetizing mechanism 80B described above, the same effect can be obtained as the printer 10A using the magnetizing mechanism 80. In addition, since the yoke member 82 is directly attached to the magnet 81, the yoke member 82 can be formed of an inexpensive soft magnetic material.

Figure 15:
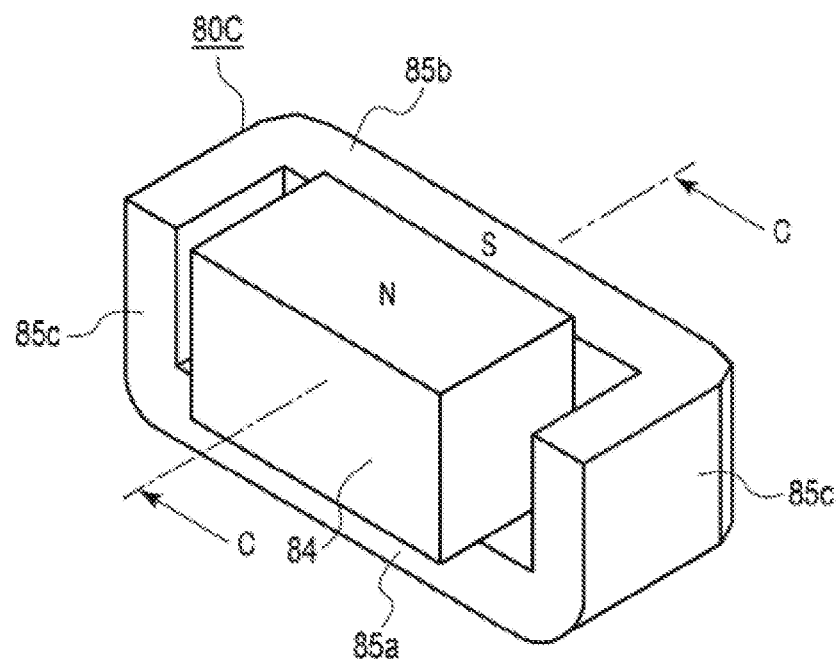
FIG. 15 is a perspective view illustrating another magnetizing mechanism according to a modified example.
Figure 16:
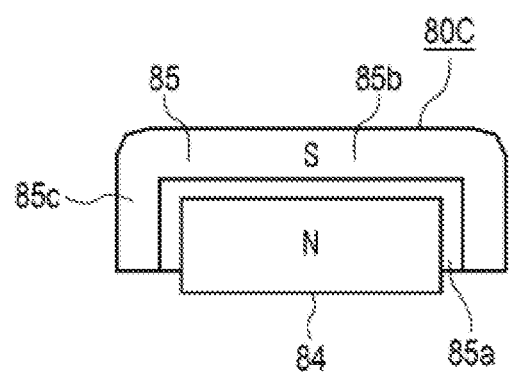
FIG. 16 is a top view of the magnetizing mechanism according to the modified example.
Figure 17:
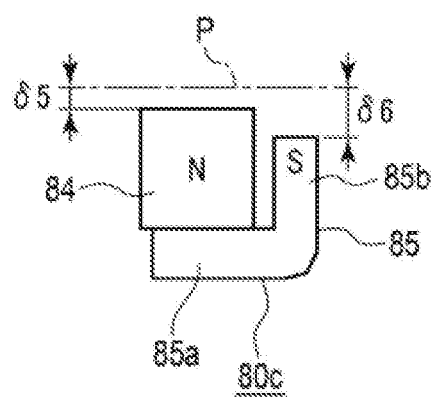
FIG. 17 is a cross-sectional view of the magnetizing mechanism according to the modified example taken along line C-C in FIG. 15.

FIGS. 15-17 illustrate a modified magnetizing mechanism 80C. In these drawings, the same functional parts as those in FIG. 6 are denoted by the same reference numerals, and a detailed description thereof will not be presented. As illustrated in FIG. 15, the magnetizing mechanism 80C includes a magnet 84 in which one polar surface (e.g., an N pole surface) faces the front surface of the medium P. A yoke member 85 having an L-shaped cross section is directly attached to the magnet 84.

The yoke member 85 includes a base portion 85a attached to other polar surface (e.g., an S pole surface) of the magnet 84, a partition wall 85b extending toward the conveyance path K of the medium P from the base portion 85a, and a partition wall 85c extending in a direction parallel to the conveyance path K of the medium P. By the yoke member 85, an S pole is generated in the partition walls 85b and 85c.

As illustrated in FIG. 17, a distance δ6 between the front surface of the medium P and the partition wall 85b is larger than a distance δ5 between the front surface of the medium P and the N pole of the magnet 84. Although not illustrated, the magnetizing mechanism 80C is also covered with a resin material.

Even if the printer uses the magnetizing mechanism 80C described above, the same effect can be obtained as the printer 10A using the magnetizing mechanism 80. In addition, since the yoke member 85 is directly attached to the magnet 84, the yoke member 85 can be formed of an inexpensive soft magnetic material.

While some embodiments of the present invention have been described, these embodiments are merely examples, and are not intended to limit the scope of the invention. These novel embodiments may be implemented in various other forms, and various omissions, replacements, and modifications may be made without departing from the scope and spirit of the invention. These embodiments and the modifications are included in the scope and spirit of the invention, and are included in the invention described in the claims and their equivalents.

What is claimed is:

1. A magnetic ink reader comprising:
a conveyance mechanism configured to convey a sheet-like medium along a conveyance path;
a magnetizing mechanism configured to magnetize magnetic ink formed on the sheet-like medium conveyed thereto along the conveyance path and including a magnet having a first side of a first magnetic polarity, that is arranged to face the sheet-like medium that is conveyed along the conveyance mechanism to the magnetizing mechanism, and a yoke that is formed of a soft magnetic material and includes a base portion attached directly to a second side of the magnet, which is opposite to the first side, and a partition wall of a second magnetic polarity extending towards the conveyance path, such that a side surface of the partition wall faces a third side of the magnet and an end surface of the partition wall faces the sheet-like medium that is conveyed along the conveyance mechanism to the magnetizing mechanism; and
a magnetic detection head disposed along the conveyance path and configured to detect magnetism of the magnetized magnetic ink formed on the sheet-like medium, wherein
a first distance between the conveyance path and the first side of the magnet and a second distance between the conveyance path and the end surface of the partition wall are different.

2. The reader according to claim 1, wherein
the partition wall is between the magnet and the magnetic detection head.

3. The reader according to claim 2, wherein
the yoke includes another partition wall of the second magnetic polarity extending towards the conveyance path, such that a side surface of said another partition wall faces a fourth side of the magnet, which is opposite to the third side.

4. The reader according to claim 1, wherein
the first distance is less than the second distance.

5. The reader according to claim 1, wherein
the first distance is greater than the second distance.

6. The reader according to claim 1, wherein
at least a part of the yoke and the magnet is covered with a resin material.

7. A printer comprising:
a conveyance mechanism configured to convey a sheet-like medium along a conveyance path;

a magnetizing mechanism configured to magnetize magnetic ink formed on the sheet-like medium conveyed thereto along the conveyance path and including a magnet having a first side of a first magnetic polarity, that is arranged to face the sheet-like medium that is conveyed along the conveyance mechanism to the magnetizing mechanism, and a yoke that is formed of a soft magnetic material and includes a base portion attached directly to a second side of the magnet, which is opposite to the first side, and a partition wall of a second magnetic polarity extending towards the conveyance path, such that a side surface of the partition wall faces a third side of the magnet and an end surface of the partition wall faces the sheet-like medium that is conveyed along the conveyance mechanism to the magnetizing mechanism;

a magnetic detection head disposed along the conveyance path and configured to detect magnetism of the magnetized magnetic ink formed on the sheet-like medium; and a printing mechanism disposed along the conveyance path and configured to print on the sheet-like medium, wherein a first distance between the conveyance path and the first side of the magnet and a second distance between the conveyance path and the end surface of the partition wall are different.

8. The printer according to claim 7, wherein the partition wall is between the magnet and the magnetic detection head.

9. The printer according to claim 8, wherein the yoke includes another partition wall of the second magnetic polarity extending towards the conveyance path, such that a side surface of said another partition wall faces a fourth side of the magnet, which is opposite to the third side.

10. The printer according to claim 7, wherein the first distance is less than the second distance.

11. The printer according to claim 7, wherein the first distance is greater than the second distance.

12. The printer according to claim 7, wherein at least a part of the yoke and the magnet is covered with a resin material.

13. A magnetic ink reader comprising:

a conveyance mechanism configured to convey a sheet-like medium along a conveyance path;

a magnetizing mechanism configured to magnetize magnetic ink formed on the sheet-like medium conveyed thereto along the conveyance path and including a magnet having a first side of a first magnetic polarity, that is arranged to face the sheet-like medium that is conveyed along the conveyance mechanism to the magnetizing mechanism, and a yoke that is formed of a soft magnetic material and includes a base portion that is separated from a second side of the magnet, which is opposite to the first side, and a partition wall of a second magnetic polarity extending towards the conveyance path, such that a side surface of the partition wall is in contact with a third side of the magnet and an end surface of the partition wall faces the sheet-like medium that is conveyed along the conveyance mechanism to the magnetizing mechanism; and a magnetic detection head disposed along the conveyance path and configured to detect magnetism of magnetized magnetic ink formed on the sheet-like medium, wherein a first distance between the conveyance path and the first side of the magnet and a second distance between the conveyance path and the end surface of the partition wall are different.

14. The reader according to claim 13, wherein the first distance is less than the second distance.

15. The reader according to claim 13, wherein at least a part of the yoke and the magnet is covered with a resin material.

* * * * *